(12) United States Patent
Chhabra et al.

(10) Patent No.: US 11,038,394 B2
(45) Date of Patent: Jun. 15, 2021

(54) GENERATOR ROTOR WITH COIL END-TURN RETENTION MECHANISM

(71) Applicant: GE AVIATION SYSTEMS LLC, Grand Rapids, MI (US)

(72) Inventors: Parmeet Singh Chhabra, Bangalore (IN); David Raju Yamarthi, Bangalore (IN); Navin Soni, Bangalore (IN); Mamatha Ramakrishnaiah, Bangalore (IN); Balamurugan Sridharan, Bangalore (IN)

(73) Assignee: GE Aviation Systems LLC, Grand Rapids, MI (US)

( * ) Notice: Subject to any disclaimer, the term of this patent is extended or adjusted under 35 U.S.C. 154(b) by 499 days.

(21) Appl. No.: 15/879,639

(22) Filed: Jan. 25, 2018

(65) Prior Publication Data
US 2019/0229574 A1  Jul. 25, 2019

(51) Int. Cl.
*H02K 3/12* (2006.01)
*H02K 3/487* (2006.01)
(Continued)

(52) U.S. Cl.
CPC ............ *H02K 3/487* (2013.01); *H02K 1/26* (2013.01); *H02K 3/12* (2013.01); *H02K 3/51* (2013.01);
(Continued)

(58) Field of Classification Search
CPC ........... H02K 3/487; H02K 3/12; H02K 1/26; H02K 3/51; H02K 7/083; H02K 7/1823;
(Continued)

(56) References Cited

U.S. PATENT DOCUMENTS 2,960,360 A    11/1960  Taylor
3,656,865 A     4/1972  Spears, Jr.
(Continued)

FOREIGN PATENT DOCUMENTS

EP    1821392 A2    8/2007
EP    3121940 A1    1/2017
FR    2454721 A1   11/1980

OTHER PUBLICATIONS

European Search Report from EP Appl. No. 19153160.7, dated Jun. 18, 2019.

*Primary Examiner* — Terrance L Kenerly
(74) *Attorney, Agent, or Firm* — Wood IP LLC (57) ABSTRACT

A rotor assembly includes a rotor core having winding slots, and one or more coils, which have slot-inserted segments included in the winding slots, and first and second end-turn segments external to the winding slots and located around opposite axial ends of the rotor core, respectively. The rotor assembly further includes a first containment band located around at least a portion of the first end-turn segments and configured to prevent the first end-turn segments from moving away from the rotor core radially, a second containment band located around at least a portion of the second end-turn segments and configured to prevent the second end-turn segments from moving away from the rotor core radially, and one or more sticks mounted in one or more of the winding slots, respectively. The first and second containment bands are retained via the sticks against moving away axially.

19 Claims, 7 Drawing Sheets

(51) Int. Cl.
*H02K 1/26* (2006.01)
*H02K 7/08* (2006.01)
*H02K 15/00* (2006.01)
*H02K 7/20* (2006.01)
*H02K 9/19* (2006.01)
*H02K 15/02* (2006.01)
*H02K 15/09* (2006.01)
*H02K 7/18* (2006.01)
*H02K 3/51* (2006.01)
*H02K 1/32* (2006.01)

(52) U.S. Cl.
CPC ........... *H02K 7/083* (2013.01); *H02K 7/1823* (2013.01); *H02K 7/20* (2013.01); *H02K 9/19* (2013.01); *H02K 15/0018* (2013.01); *H02K 15/024* (2013.01); *H02K 15/09* (2013.01); *H02K 1/32* (2013.01)

(58) Field of Classification Search
CPC ........ H02K 7/20; H02K 9/19; H02K 15/0018; H02K 15/024; H02K 15/29; H02K 1/32

USPC ........................................................ 310/214
See application file for complete search history.

(56) References Cited

U.S. PATENT DOCUMENTS

| | | |
|---|---|---|
| 3,663,849 A | 5/1972 | Heob |
| 4,389,161 A | 6/1983 | Brumen |
| 5,256,035 A | 10/1993 | Norris et al. |
| 6,232,687 B1 | 5/2001 | Hollenbeck et al. |
| 6,648,715 B2 | 11/2003 | Wiens et al. |
| 6,982,506 B1 | 1/2006 | Johnsen |
| 7,687,928 B2 * | 3/2010 | Taneja ............. F02C 7/268 290/36 R |
| 8,994,242 B2 | 3/2015 | Kleber |
| 9,018,817 B2 | 4/2015 | Bradley |
| 2006/0119196 A1 * | 6/2006 | Konishi ............. H02K 9/19 310/64 |
| 2011/0215659 A1 * | 9/2011 | Amaral ............. H02K 9/06 310/52 |
| 2016/0043613 A1 * | 2/2016 | Patel ............. H02K 9/20 310/54 |

* cited by examiner

GENERATOR ROTOR WITH COIL END-TURN RETENTION MECHANISM

FIELD OF THE INVENTION

The present disclosure generally relates to generators, and more specifically to retention mechanism of coil end-turn segments in generator rotors.

BACKGROUND OF THE INVENTION

Gas turbine engines are rotary engines that extract energy from a flow of combusted gases passing through the engine onto a multitude of turbine blades. A generator coupled with a gas turbine engine converts the mechanical power of the engine into electrical energy by using pressure spools of the engine to rotate the generator rotor, and thus, generate electricity.

Some generators are used with high rotational speeds. During the high speed rotation, high centrifugal forces may be imposed upon the generator rotors. The centrifugal force imposed upon a rotor may be strong enough to cause wire coils wound on the rotor to bend or get dislocated. Such bending, over time, may result in mechanical breakdown of the wires and compromise of the coil insulation system. Such dislocation may be a potential source of imbalance within the rotor.

SUMMARY OF THE INVENTION

A rotor assembly for a generator, includes a rotor core having winding slots, and one or more coils, which have slot-inserted segments included in the winding slots, and first and second end-turn segments external to the winding slots and located around opposite axial ends of the rotor core, respectively. The rotor assembly further includes a first containment band located around at least a portion of the first end-turn segments and configured to prevent the first end-turn segments from moving away from the rotor core radially, a second containment band located around at least a portion of the second end-turn segments and configured to prevent the second end-turn segments from moving away from the rotor core radially, and one or more sticks mounted in one or more of the winding slots, respectively. The first and second containment bands are retained via the sticks against moving away axially.

A generator includes a stator and a rotor assembly rotationally mounted at least partially within the stator. The rotor assembly includes a rotor core having winding slots, and one or more coils, which have slot-inserted segments included in the plurality of winding slots, and first and second end-turn segments external to the winding slots and located around opposite axial ends of the rotor core, respectively. The rotor assembly further includes a first containment band located around at least a portion of the first end-turn segments and configured to prevent the first end-turn segments from moving away from the rotor core radially, a second containment band located around at least a portion of the second end-turn segments and configured to prevent the second end-turn segments from moving away from the rotor core radially, and one or more sticks mounted in one or more of the winding slots, respectively. The first and second containment bands are retained via the sticks against moving away axially.

A method of assembling a rotor, includes: providing a rotor core having winding slots; winding one or more coils on the rotor core, with slot-inserted segments of the coils included in the winding slots, and first and second end-turn segments of the coils external to the winding slots and located around opposite axial ends of the rotor core, respectively; disposing a first containment band around at least a portion of the first end-turn segments to prevent the first end-turn segments from moving away from the rotor core radially; connecting one or more sticks to the first containment band, by inserting the one or more sticks into one or more of the winding slots, respectively, axially pushing the sticks into the first containment band and snap-fitting the sticks onto the first containment band; disposing a second containment band around at least a portion of the second end-turn segments to prevent the second end-turn segments from moving away from the rotor core radially; axially pushing the second containment band toward the sticks and snap-fitting the second containment onto the sticks; and holding the first and second containment bands by the sticks against moving away axially.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

One or more embodiments of the present disclosure will be described below. Unless defined otherwise, technical and scientific terms used herein have the same meaning as is commonly understood by one of skill in the art to which this invention belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean any, some, or all of the listed items. The use of "including," "comprising" or "having" and variations thereof herein are meant to encompass the items listed thereafter and equivalents thereof as well as additional items. The term "coupled" or "connected" or the like includes but is not limited to being connected physically or mechanically, and may be connected directly or indirectly.

Embodiments of the present disclosure relate to a rotor assembly for a generator. The rotor assembly includes a rotor core defining a plurality of winding slots, one or more coils having slot-inserted segments included in the winding slots of the rotor core, and end-turn segments external to the winding slots and extending from opposite axial ends of the rotor core, respectively. Containment bands are used to hold the coil end-turn segments against from moving away radially, and one or more sticks are used to hold the containment bands against moving away axially.

Figure 1:
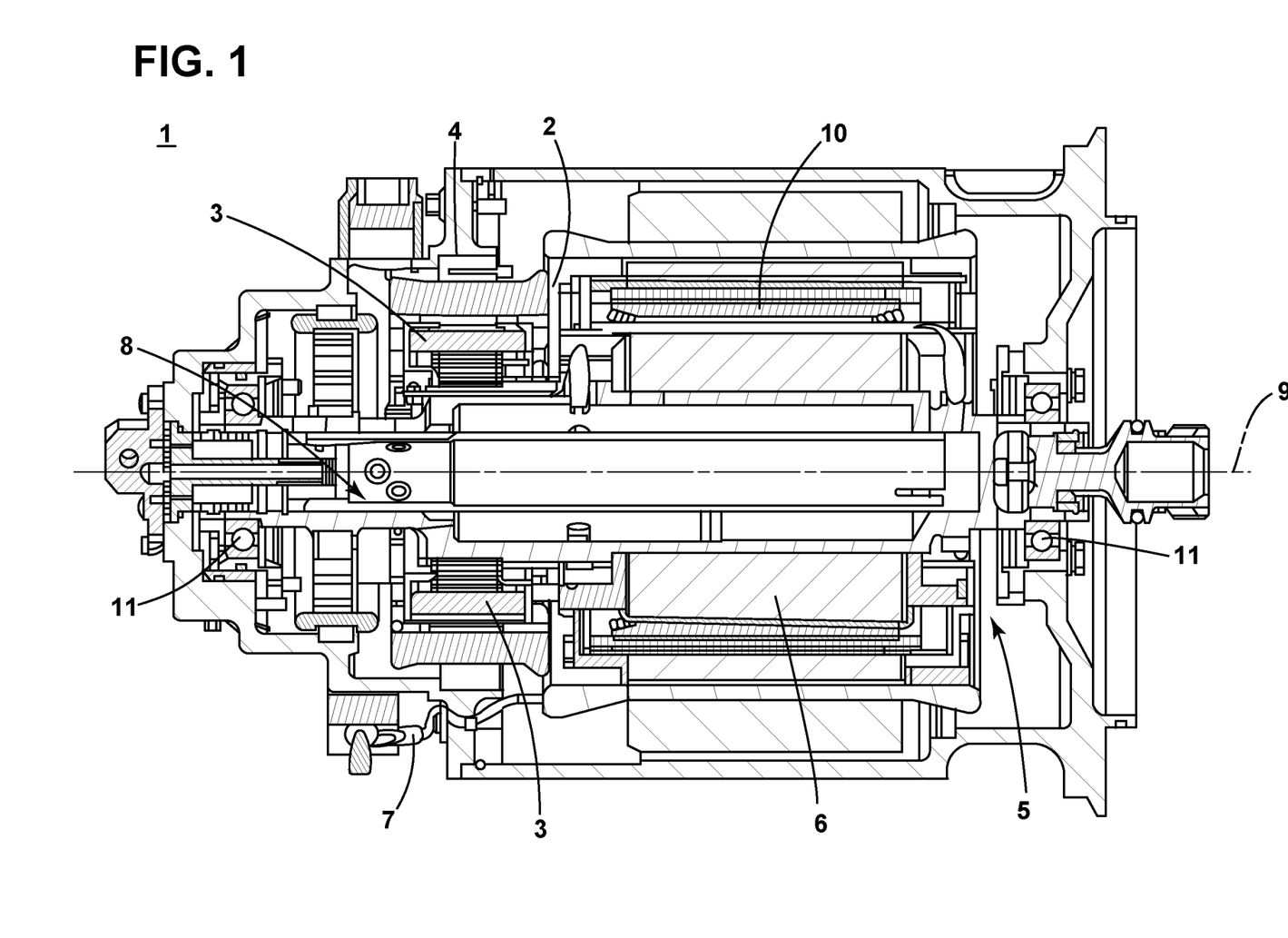
FIG. 1 is an example schematic view of an electric machine assembly, which includes an exciter rotor and a rotatable shaft.

FIG. 1 illustrates an exemplary electric machine assembly, such as a generator 1, which includes a first machine 2 having an exciter rotor 3 and an exciter stator 4, and a synchronous second machine 5 having a main machine rotor 6 and a main machine stator assembly 10. At least one power connection is provided on the exterior of the generator 1 to provide for the transfer of electrical power to and from the generator 1. Power is transmitted by this power connection, shown as an electrical power cable 7, directly or indirectly, to the electrical load and may provide for a three phase with a ground reference output from the generator 1.

The generator 1 further includes a rotatable shaft 8 mechanically coupled to a source of axial rotation, which may be a gas turbine engine, about an axis of rotation 9. The rotatable shaft 8 is supported by spaced bearings 11. The exciter rotor 3 and main machine rotor 6 are mounted to the rotatable shaft 8 for rotation relative to the stators 4, 10. The stators 4, 10 may be mounted to any suitable part of a housing portion of the generator 1. The rotatable shaft 8 is configured such that mechanical force from a running turbine engine provides rotation to the shaft 8. Alternatively, in an example of a starter/generator, rotation of the rotatable shaft 8 of the generator 1 during a starting mode produces a mechanical force that is transferred through the shaft 8 to provide rotation to the turbine engine.

Figure 2:
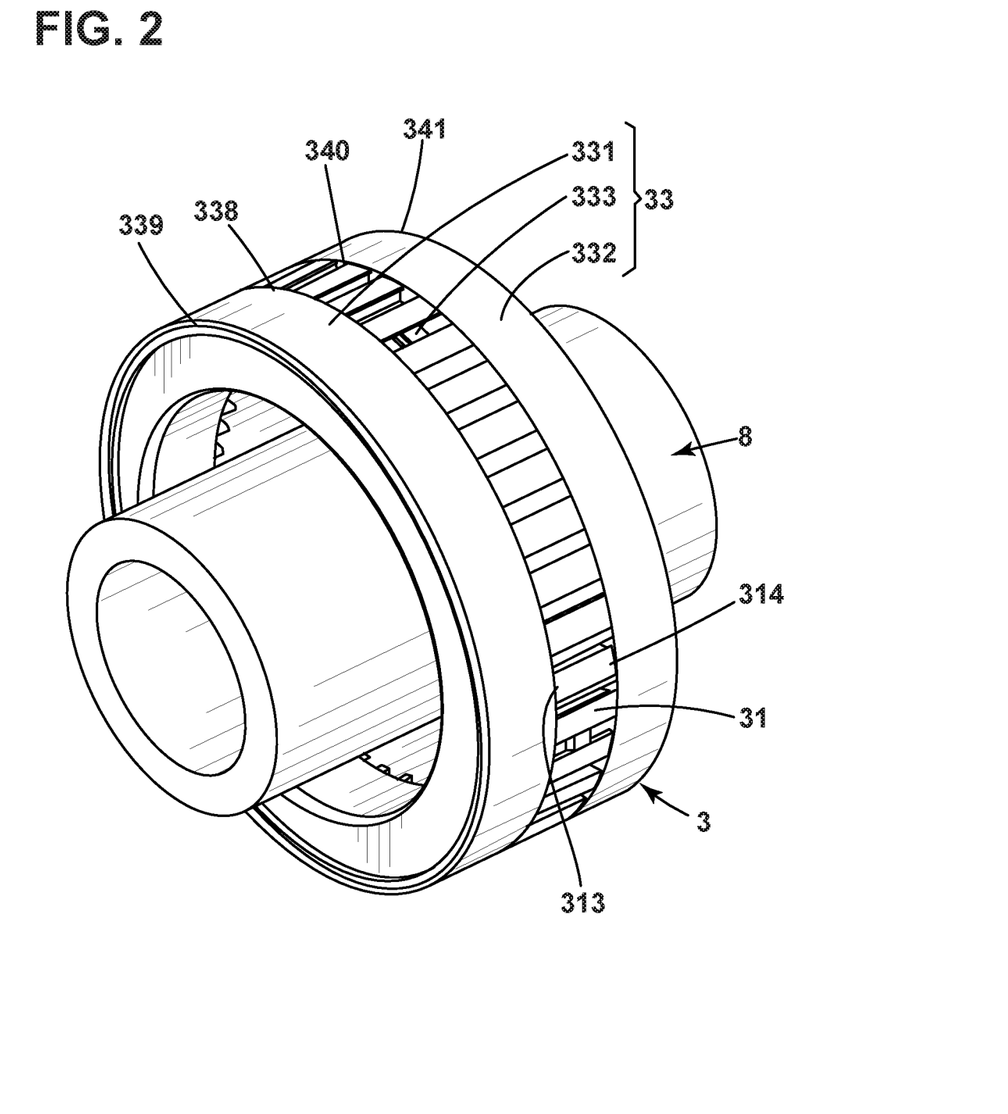
FIG. 2 is an example perspective view illustrating the exciter rotor and the rotatable shaft in accordance with various aspects described herein.
Figure 3:
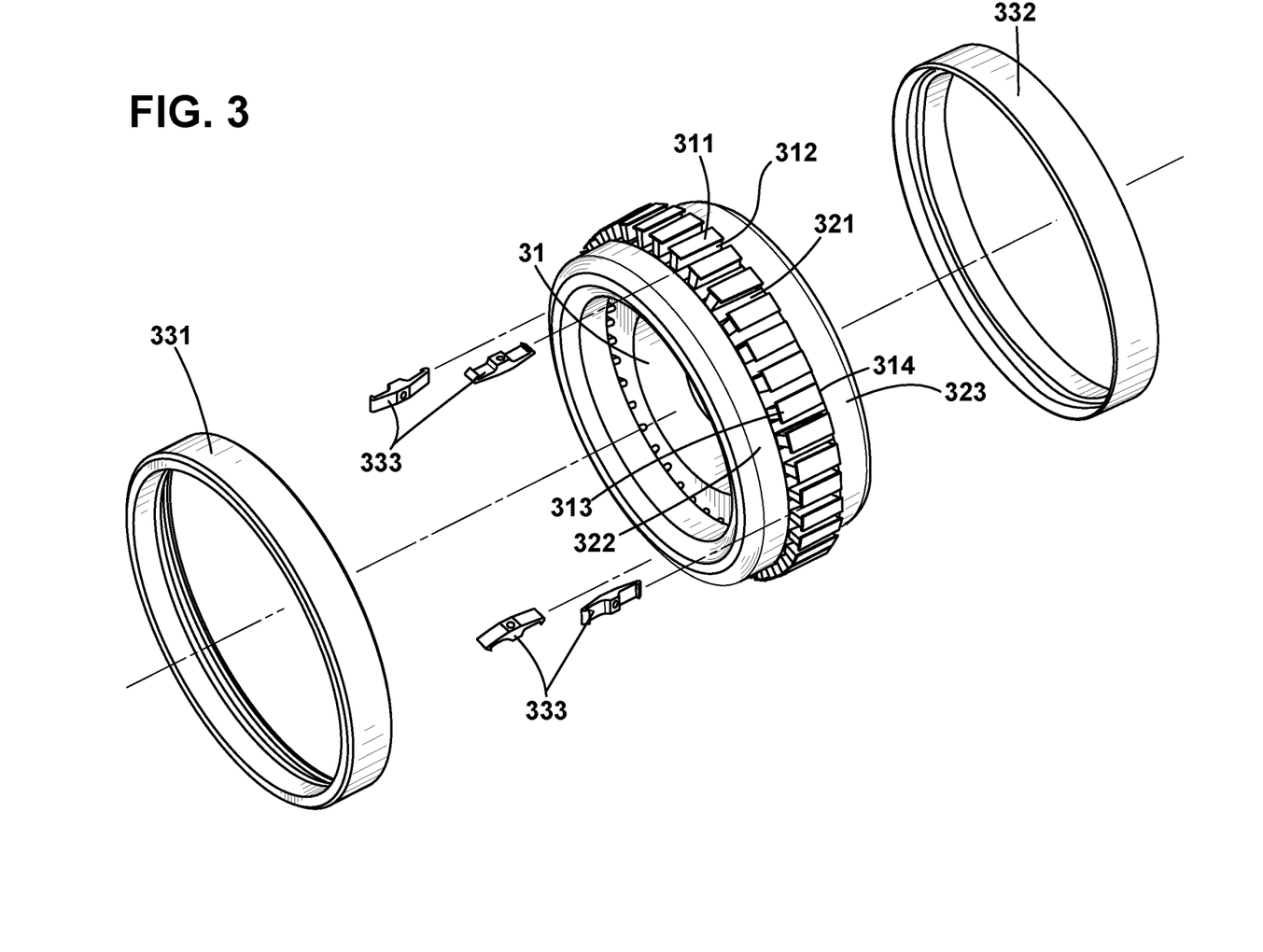
FIG. 3 is an exploded view of the exciter rotor in accordance with various aspects described herein.
Figure 4:
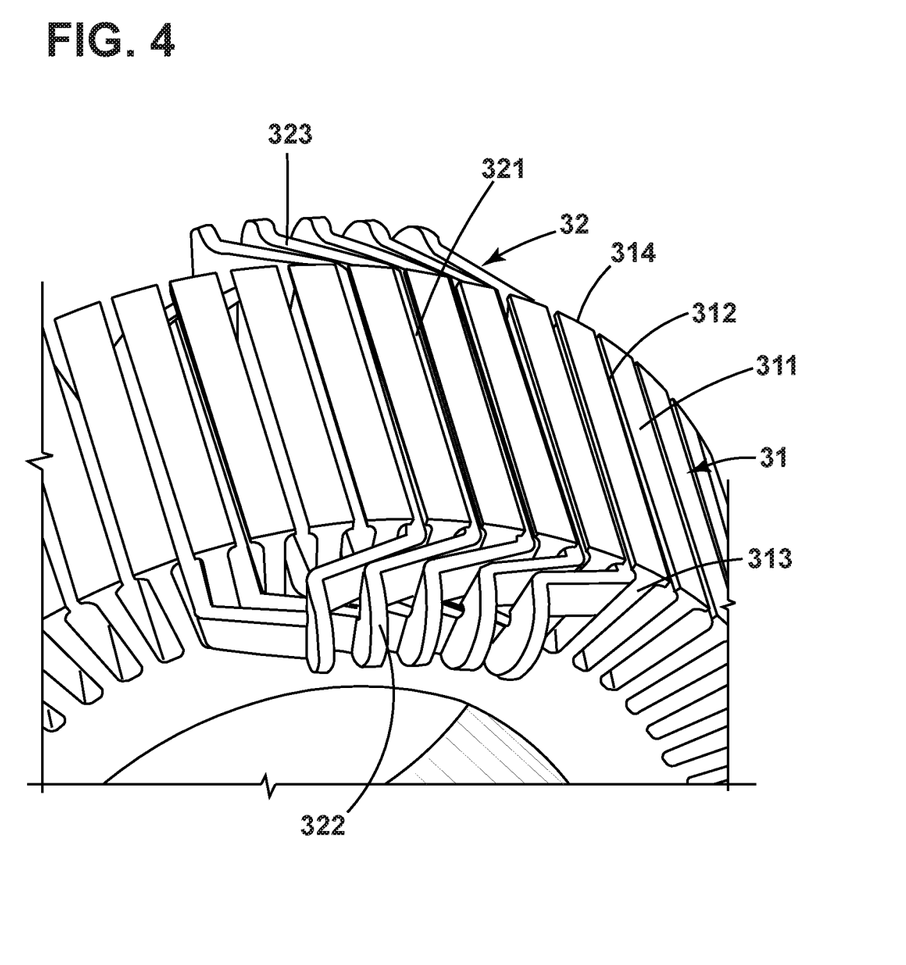
FIG. 4 is an example close-up perspective view of the exciter rotor, in a partially assembled state in accordance with various aspects described herein.
Figure 5:
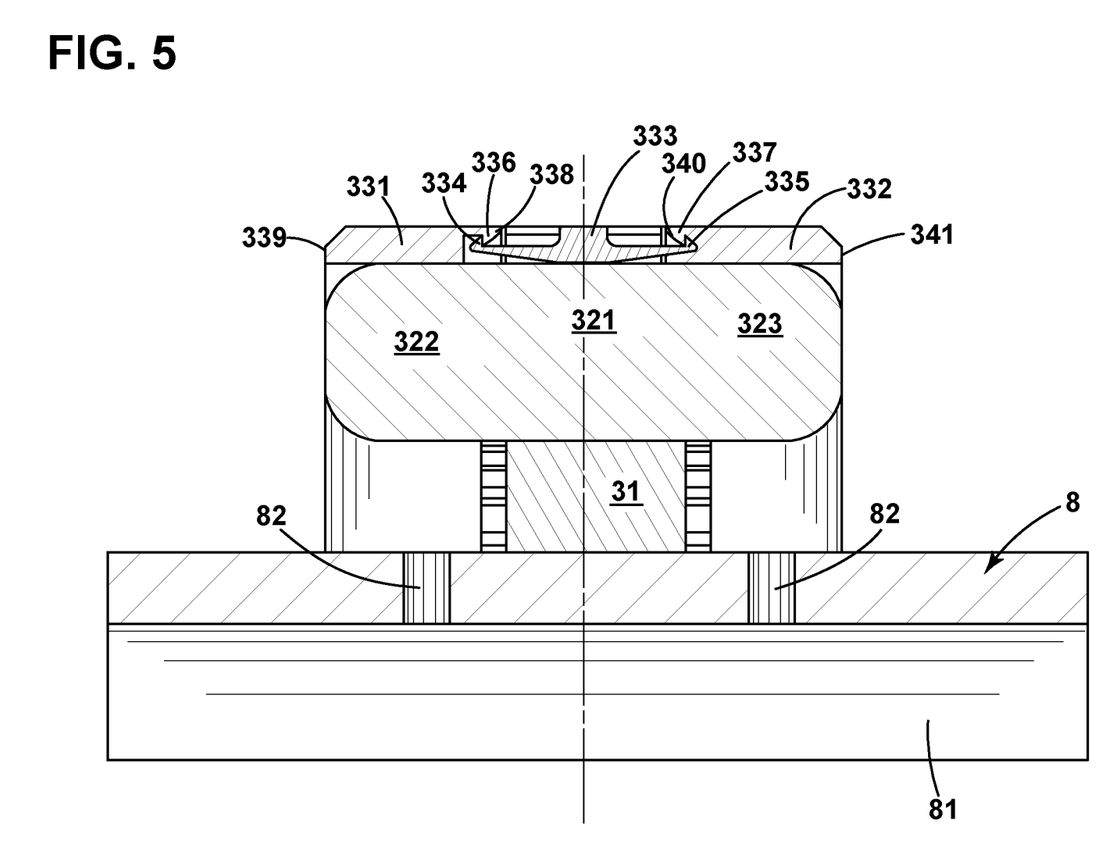
FIG. 5 is an example cross section view showing an upper half of the exciter rotor and shaft assembly in accordance with various aspects described herein.

FIGS. 2-5 illustrate the exciter rotor 3 in greater detail, wherein FIG. 2 is a perspective view showing the exciter rotor 3 in assembly and coupled to the shaft 8, FIG. 3 is an exploded view of the exciter rotor 3, showing main parts of the exciter rotor 3, FIG. 4 is a close-up perspective view showing the exciter rotor 3 in a partially assembled state, and FIG. 5 is a cross section view of an upper half of the exciter rotor 3 and the shaft 8 in FIG. 2.

The exciter rotor 3, as shown, includes a generally cylindrical rotor core 31. The cylindrical rotor core 31 includes a plurality of spaced posts 311 defining a corresponding plurality of spaced winding slots 312 therebetween, arranged in a circumferential direction of the core 31. Each of the plurality of winding slots 312 is configured with an open top and may terminate in opposing open ends spaced axially along the core 31. For instance, the ends of the winding slot 312 may axially terminate at the same length as the core 31. The core 31 may be formed from a magnetic material, such as Cobalt-Iron (CoFe) alloy, which is magnetic in nature. It is generally manufactured by gluing and stacking thin stamps of the alloy together along the length the core.

As shown in FIG. 4, the exciter rotor 3 further includes a plurality of coils 32 (only a few are shown), that are wound about the core 31, by inserting one or more segments 321 of each coil 32 into two separate winding slots 312. The winding slots that each coil 32 is inserted into are, for example, non-adjacent, though it will be appreciated that the present disclosure is not limited to this scheme. The coil 32 extending the length of the winding slot 312 has two non-slot-inserted segments 322, 323, external to the winding slot 312 and extending from opposite axial ends of the rotor core 31, respectively. These coil segments 321 inserted into the winding slots 312 are referred to herein as slot-inserted segments, whereas these non-slot-inserted segments 322, 323 are referred to herein as end-turn segments, wherein the end-turn segments 322 located at a first axial end 313 of the rotor core 31 is referred to as first end-turn segments and the end-turn segments 323 located at a second axial end 314 of the rotor core 31 is referred to as second end-turn segments. In some embodiments, as shown in FIG. 4, each coil 32 is bent or twisted at the end-turn segments 322, 323 thereof.

The coils 32 may be made from any suitable conductive materials, including conductive metals, such as copper, aluminum, zinc, brass, carbon, or iron. The coils 32 may have various cross-sectional shapes, such as round, square, or rectangle. For example, in the embodiment as illustrated in FIG. 4, the coils are rectangular in cross section. Moreover, each coil 32 may be constructed of a single conductor, or a plurality of conductors.

As the coil end-turn segments 322, 323 are subject to radial loads when the exciter rotor 31 rotates, an end-turn retention assembly 33 including a first containment band 331, a second containment band 332, and one or more sticks 333, as shown in FIGS. 3 and 4, is provided for retaining the coil end-turn segments 322, 323. The first containment band 331 is located around at least a portion of the first end-turn segments 322 and configured to prevent the first end-turn segments 322 from radially moving away from the rotor core 31. In particular, the first containment band 331 includes an annular structure radially enclosing therein the first end-turn segments 322. Similarly, the second containment band 332 is located around at least a portion of the second end-turn segments 323 and configured to prevent the second end-turn segments 323 from radially moving away from the rotor core 31. In particular, the second containment band 332 includes an annular structure radially enclosing therein the second end-turn segments 323. In some embodiments, the first containment band 331 has an axial length equal to or greater than that of the first end-turn segments 322, such that the first end-turn segments 322 can be covered by the containment band 331 substantially in the entire axial length thereof, and the second containment band 332 has an axial length equal to or greater than that of the second end-turn segments 323, such that the second end-turn segments 323 can be covered by the second containment band 332 substantially in the entire axial length thereof.

As shown in FIG. 5, each of the sticks 333 is inserted in one of the winding slots 312, and thus sits above the slot-inserted segment 321 of the coil 32 in the same winding slot 312. Each stick 333 includes a first stick-catch 334 and a second stick-catch 335 formed at opposite ends thereof, respectively. The first containment band 331 has a first band-catch 336 for engaging the first stick-catch 334 in a snap fit manner, and the second containment band 332 has a second band-catch 337 for engaging the second stick-catch 335 in a snap fit manner. In some embodiments, each of the stick-catches 334, 335 includes an upward hook, and each of the band-catches 336, 337 includes a downward hook. The stick-catch 334 (or 335) and the corresponding band-catch 336 (or 337), either or both, can bend radially to lock into each other, when they are axially pushed towards each other.

As shown in FIG. 3, there are four sticks 333 used to retain the first and second containment bands 331 and 332. The four sticks may be equidistantly arranged in the circumferential direction of the core 31. Band-catches 336, 337 are provided at the first and second containment bands 331 and 332 corresponding to the positions of the sticks 333. For example, the first containment band 331 may include at least four first band-catches 336 corresponding to the first stick-catches 334 of the four sticks 333, and the second containment band 332 may include at least four second band-catches 337 corresponding to the second stick-catches 334 of the four sticks 333. There is no limitation to the number of the sticks used. Less or more than four sticks may be used, depending on needs.

Referring to FIGS. 2 and 5, the first containment band 331 includes opposite axial ends, namely an inner end (a core-adjacent end) 338 adjacent to the rotor core 31, specifically, adjacent to the first axial end 313 of the rotor core 31, and an outer end 339 away from the rotor core 31. Similarly, the second containment band 332 includes opposite axial ends, namely an inner end (a core-adjacent end) 340 adjacent to the rotor core 31, specifically, adjacent to the second axial end 314 of the rotor core 31, and an outer end 341 away from the rotor core 31. The first band-catch 336 is formed around the core-adjacent end 338 of the first containment band 331, and the second band-catch 337 is formed around the core-adjacent end 340 of the second containment band 332. In some embodiments, the entire core-adjacent end of the containment band 331 or 332 may be shaped as a common band-catch for engaging the corresponding stick-catches of all the sticks.

In assembly, the first band-catch 336 is locked to the first stick-catch 334 of the stick 333 and the second band-catch 337 is locked to the second stick-catch 335 of the stick 333, such that the first and second containment bands 331 and 332 are retained to the sticks 333 against moving away axially.

The first and second containment bands 331 and 332 may be made from metallic materials, including but not limited to metallic alloys such as a Titanium alloy. The sticks may be made from soft metallic/non-metallic materials such as Kapton or an Aluminum alloy, via conventional manufacturing techniques or additive manufacturing.

As shown in FIG. 5, in which only an upper half of the exciter rotor and the shaft is shown, the rotatable shaft 8 may be hollowed to provide a passage 81 therein for allowing cooling fluid such as cooling oil to pass. The rotatable shaft 8 may further define one or more radial holes 82 through a thickness thereof. The radial holes 82 is configured to allow the cooling fluid to flow from the passage 81 to impinge and cool the first and second end-turn segments 322, 323 of the coils 32. There is at least one axial gap defined between the rotor core 31 and at least one of the first and second containment bands 331, 332. In particular, as shown in FIG. 5, there is an axial gap between the rotor core 31 and each of the first and second containment bands 331, 332. The axial gap is configured to allow the cooling fluid that impinges and cools the first and second end-turn segments 322, 323 to exit the exciter rotor 3 radially.

Figure 6:
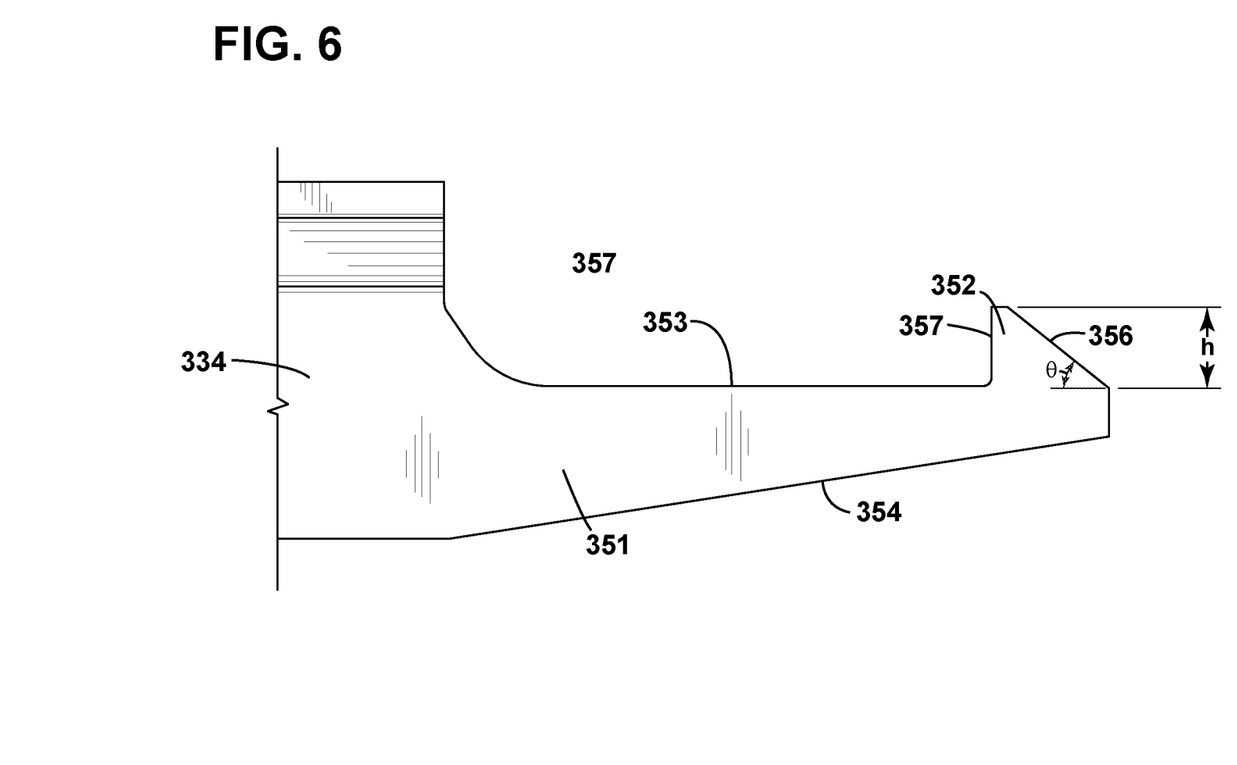
FIG. 6 is an example schematic view showing one stick-catch, as an example of stick-catches of sticks used in the exciter rotor in accordance with various aspects described herein.

The matched stick-catch and band-catch may be shaped and sized to enable snap fit connection therebetween. Taking the stick-catch 334 as shown in FIG. 6 as an example of the stick-catches, the shapes and sizes of the stick-catches will be described hereinafter. Referring to FIG. 6, the stick-catch 334 includes an arm 351 formed with an upward hook 352 at a distal end thereof. The arm 351 has a substantially horizontal upper surface 353 and an uptilted lower surface 354. The uptilted lower surface 354 tilts up from a stick middle portion to the stick distal end where the upward hook 352 is formed. The upward hook 352 includes a sliding surface 356 configured to slide on a corresponding sliding surface of a downward hook of the band-catch 336 (shown in FIG. 5) in the process of assembly, and a retaining surface 357 configured to hold on a corresponding retaining surface of the downward hook of the band-catch 336 (shown in FIG. 5) upon assembly. In some embodiments, the retaining surface 357 is substantially perpendicular to the upper surface 353. The hook 352 has a height h defined between a top of the hook 352 and the upper surface 353 of the arm 351. The sliding surface 356 is at a certain angle (contact angle θ) to the upper surface 353.

The sizes of the hook 352, including the height h and the contact angle θ, basically depend on the overall size of the exciter rotor, as well as the available space for the hook 352 to enter the band-catch 336 (shown in FIG. 5) during assembly. It is expected to achieve good engagement between the stick-catch and band-catch upon assembly, without the need for the stick-catch and band-catch to deflect a lot during assembly. Thus the size of the hook 352 is designed to achieve an appropriated balance between reliable engagement upon assembly and deflection required during assembly. In the conditions of achieving reliable engagement, the sticks and containment bands are designed such that minimal load is required to assemble or snap the two. In some embodiments, the height h may be in a range from about 1 mm to about 8 mm. In some embodiments, the contact angle θ may be in a range from about 15 degrees to about 45 degrees.

Similar hooks are provided at the core-adjacent ends of the containment bands. In some embodiments, as shown in FIG. 5, the band catch 336 or 337 includes a downward hook similar to the upward hook of the stick-catch. The downward hook may have a shape and size the same as the upward hook 352. For example, the downward hook may have a hook height and a contact angle the same as those for the upward hook 352.

Figure 7:
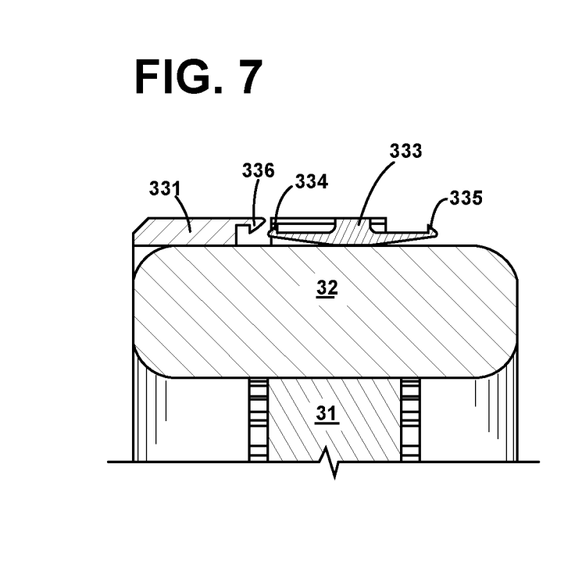
FIGS. 7-9 illustrate an example method for assembling the exciter rotor of in accordance with various aspects described herein.
Figure 8:
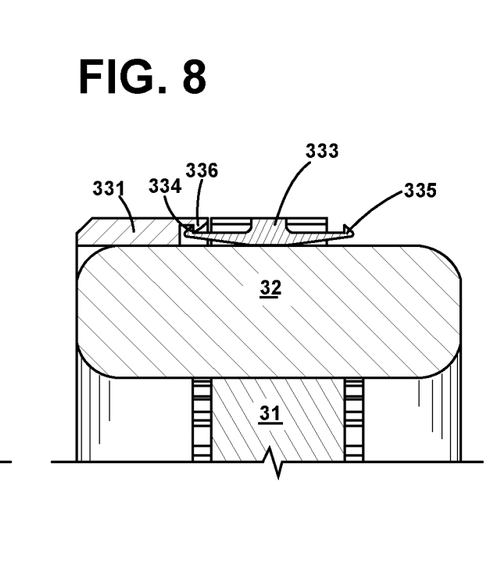
Figure 9:
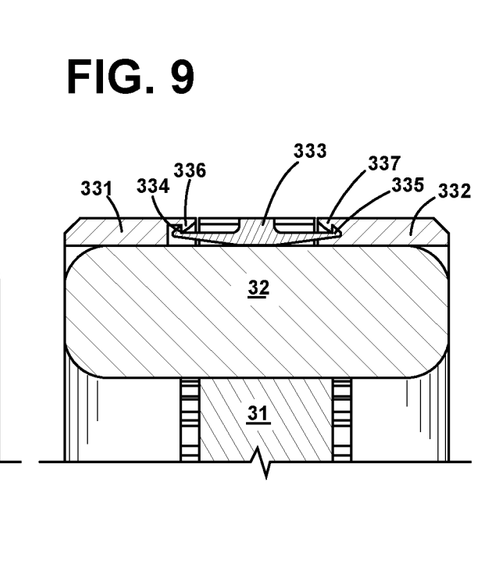

Embodiments of the present disclosure also relate to a method for assembling a rotor as described above. Referring to FIGS. 7-9, an exemplary assembling process will be described hereinafter. After coils 32 are wound on the rotor core 31, as shown in FIG. 7, the first containment band 331 is held in position. Specifically, the first containment band 331 is placed to surround the first end-turn segments of the coils 32 to prevent the first end-turn segments against moving away from the rotor core radially. The sticks 333 (only one stick is shown in FIGS. 7-9) are inserted into the corresponding winding slots, one at a time. Then, as shown in FIG. 8, the inserted sticks 333 are pushed further into the first containment band 331, and then are locked with the first containment band 331. As shown in FIG. 9, after the sticks 333 are locked with the first containment band 331, the second containment band 332 is placed to surround the second end-turn segments of the coils 32 to prevent the second end-turn segments against moving away from the rotor core radially, and then the second containment band 332 is pushed axially towards the free ends of the sticks 333 until it gets locked with the sticks 333. As such, both the first and second containment bands 331, 332 are locked with the sticks 333 and prevented against moving away from the rotor core 31 axially.

When the stick 333 is pushed into the first containment band 331, a first axial end of the stick 333 bends radially inside the first containment band 331, in order to make the first stick-catch 334 snap fitted to the first containment band 331. When the second containment band 332 is axially pushed towards the sticks 333, second axial ends of the sticks 333 bend radially inside the second containment band 332, in order to make the second containment band 332 snap fitted to the sticks 333.

The rotor assembly as described herein above enables safe operation of the rotor at high speeds and temperatures by using the containment bands to radially retain the coil end-turn segments in place and using the sticks to axially arrest the containment bands in place. Moreover, the rotor assembly also enables easy manufacturing, assembly and installation. The sticks used to retain the containment bands can be fabricated by conventional or additive manufacturing technologies, and can be easily inserted into the winding slots along an axial direction during assembly. The containment bands and sticks can easily get locked into each other via snap fit mechanism. The snap fit connection allows creation of axial gaps between the containment bands and the rotor core, which enables wet cavity cooling of the coils, as has been described above in detail.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A rotor assembly for a generator, comprising: a rotor core having a plurality of winding slots arranged in a circumferential direction of the rotor core;
   one or more coils, comprising (i) a plurality of slot-inserted segments, each slot-inserted segment being inserted between two winding slots of the plurality of winding slots; and (ii) first and second end-turn segments external to the winding slots and located around opposite axial ends of the rotor core, respectively;
   a first containment band comprising a first-band catch and being located around at least a portion of the first end-turn segments and configured to prevent the first end-turn segments from moving away from the rotor core radially;
   a second containment band comprising a second-band catch and being located around at least a portion of the second end-turn segments and configured to prevent the second end-turn segments from moving away from the rotor core radially; and
   one or more sticks (i) comprising a first stick-catch and a second stick-catch respectively formed at opposite ends thereof; (ii) being inserted between two winding slots of the plurality of winding slots; and (ii) arranged above a slot-inserted segment of the plurality of slot-inserted segments;
   wherein via a snap-fit mechanism, the first band-catch is locked to the first stick catch, and the second band-catch is locked to the second stick-catch, such that the first and second containment bands are retained via the sticks against moving away axially.

2. The rotor assembly of claim 1, wherein the first and second containment bands are connected to the sticks via a snap fit mechanism.

3. The rotor assembly of claim 1, wherein the stick-catches comprise an upward hook, and the band-catches comprise a downward hook.

4. The rotor assembly of claim 1, wherein:
   the first containment band comprises a core-adjacent end adjacent to one of the opposite axial ends of the rotor core, and the first band-catch is formed around the core-adjacent end of the first containment band; and
   the second containment band comprises a core-adjacent end adjacent to the other of the opposite axial ends of the rotor core, and the second band-catch is formed around the core- adjacent end of the second containment band.

5. The rotor assembly of claim 1, wherein the first containment band radially encloses therein the at least a portion of the first end-turn segments, and the second containment band radially encloses therein the at least a portion of the second end-turn segments.

6. The rotor assembly of claim 1, wherein an axial gap is defined between the rotor core and at least one of the first and second containment bands, and the axial gap is configured to allow cooling fluid for cooling the coils to exit radially.

7. A generator, comprising:
   a stator; and
   a rotor assembly rotationally mounted at least partially within the stator, the rotor assembly comprising:
   rotor core having a plurality of winding slots arranged in a circumferential direction of the rotor core;
   one or more coils, comprising (i) a plurality of slot-inserted segments, each slot-inserted segment being inserted between two winding slots of the plurality of winding slots; and (ii) first and second end-turn segments external to the winding slots and located around opposite axial ends of the rotor core, respectively;
   a first containment band comprising a first-band catch and being located around at least a portion of the first end-turn segments and configured to prevent the first end-turn segments from moving away from the rotor core radially;
   a second containment band comprising a second-band catch and being located around at least a portion of the second end-turn segments and configured to prevent the second end-turn segments from moving away from the rotor core radially; and
   one or more sticks (i) comprising a first stick-catch and a second stick-catch respectively formed at opposite ends thereof; (ii) being inserted between two winding slots of the plurality of winding slots; and (ii) arranged above a slot-inserted segment of the plurality of slot-inserted segments.
   wherein via a snap-fit mechanism, the first band-catch is locked to the first stick catch, and the second band-catch is locked to the second stick-catch, such that the first and second containment bands are retained via the sticks against moving away axially.

8. The generator of claim 7, wherein the first and second containment bands are connected to the sticks via a snap fit mechanism.

9. The generator of claim 7, wherein:
   the sticks comprise a first stick-catch and a second stick-catch respectively formed at opposite ends thereof;
   the first containment band comprises a first band-catch for engaging the first stick-catch in a snap fit manner; and
   the second containment band comprises a second band-catch for engaging the second stick-catch in a snap fit manner.

10. The generator of claim 9, wherein the stick-catches comprise an upward hook, and the band-catches comprise a downward hook.

11. The generator of claim 9, wherein:
   the first containment band comprises a core-adjacent end adjacent to one of the opposite axial ends of the rotor core, and the first band-catch is formed around the core-adjacent end of the first containment band; and the second containment band comprises a core-adjacent end adjacent to the other of the opposite axial ends of the rotor core, and the second band-catch is formed around the core-adjacent end of the second containment band.

12. The generator of claim 7, wherein the first containment band radially encloses therein the at least a portion of the first end-turn segments, and the second containment band radially encloses therein the at least a portion of the second end-turn segments.

13. The generator of claim 7, further comprising a hollowed rotation shaft, on which the rotor core is mounted, wherein radial holes defined through the thickness of the rotation shaft and at least one axial gap defined between the rotor core and at least one of the first and second containment bands are configured to allow cooling fluid to come out from the rotation shaft, impinge and cool the first and second end-turn segments of the coils, and exit radially from the rotor assembly.

14. A method of assembling a rotor, comprising:
providing a rotor core having a plurality of winding slots arranged in a circumferential direction of the rotor core;
winding one or more coils on the rotor core, with a plurality of slot-inserted segments of the coils, each slot-inserted segment being inserted between two winding slots of the plurality of winding slots; and first and second end-turn segments of the coils external to the winding slots and located around opposite axial ends of the rotor core, respectively;
disposing a first containment band comprising a first-band catch around at least a portion of the first end-turn segments to prevent the first end-turn segments from moving away from the rotor core radially;
connecting one or more sticks comprising a first stick-catch and a second stick-catch respectively formed at opposite ends thereof, to the first containment band, by inserting the one or more sticks between two winding slots of the plurality of winding slots and arranging the one or more sticks above a slot-inserted segment of the plurality of slot-inserted segments;

axially pushing the sticks into the first containment band and snap-fitting the sticks onto the first containment band such that the first band catch is locked to the first stick catch;
disposing a second containment band comprising a second-band catch around at least a portion of the second end-turn segments to prevent the second end-turn segments from moving away from the rotor core radially;
axially pushing the sticks into the second containment band and snap-fitting the sticks onto the second containment band such that the second band catch is locked to the second stick catch; and
holding the first and second containment bands by the sticks against moving away axially.

15. The method of claim 14, wherein the disposing a first containment band around at least a portion of the first end-turn segments comprises radially enclosing therein the at least a portion of the first end-turn segments, and the disposing a second containment band around at least a portion of the second end-turn segments comprises radially enclosing therein the at least a portion of the second end-turn segments.

16. The method of claim 14, wherein the axially pushing the sticks into the first containment band comprises causing first axial ends of the sticks to bend radially inside the first containment band, and the axially pushing the second containment band toward the sticks comprises causing second axial ends of the sticks to bend radially inside the second containment band.

17. The method of claim 14, further comprising mounting the rotor core on a hollowed rotation shaft.

18. The method of claim 17, further comprising introducing cooling fluid from the hollowed rotation shaft, to impinge and cool the first and second end-turn segments of the coils, and exit radially from at least one axial gap defined between the rotor core and at least one of the first and second containment bands.

19. The method of claim 14, wherein the sticks are fabricated through additive manufacturing.

* * * * *